Draftsma

Sept. 30, 1924. Re. 15,922

G. A. CHADDOCK

DEVICE FOR UTILIZING THE REACTIVE FORCE SET UP BY ROTATING A SCREW PROPELLER OR SCREW FAN OR THE LIKE IN A FLUID

2 Sheets-Sheet 1

Original Filed July 3, 1922

Inventor

George Albert Chaddock

Sept. 30, 1924. G. A. CHADDOCK Re. 15,922
DEVICE FOR UTILIZING THE REACTIVE FORCE SET UP BY ROTATING A SCREW PROPELLER OR SCREW FAN OR THE LIKE IN A FLUID
Original Filed July 3, 1922 2 Sheets-Sheet 2
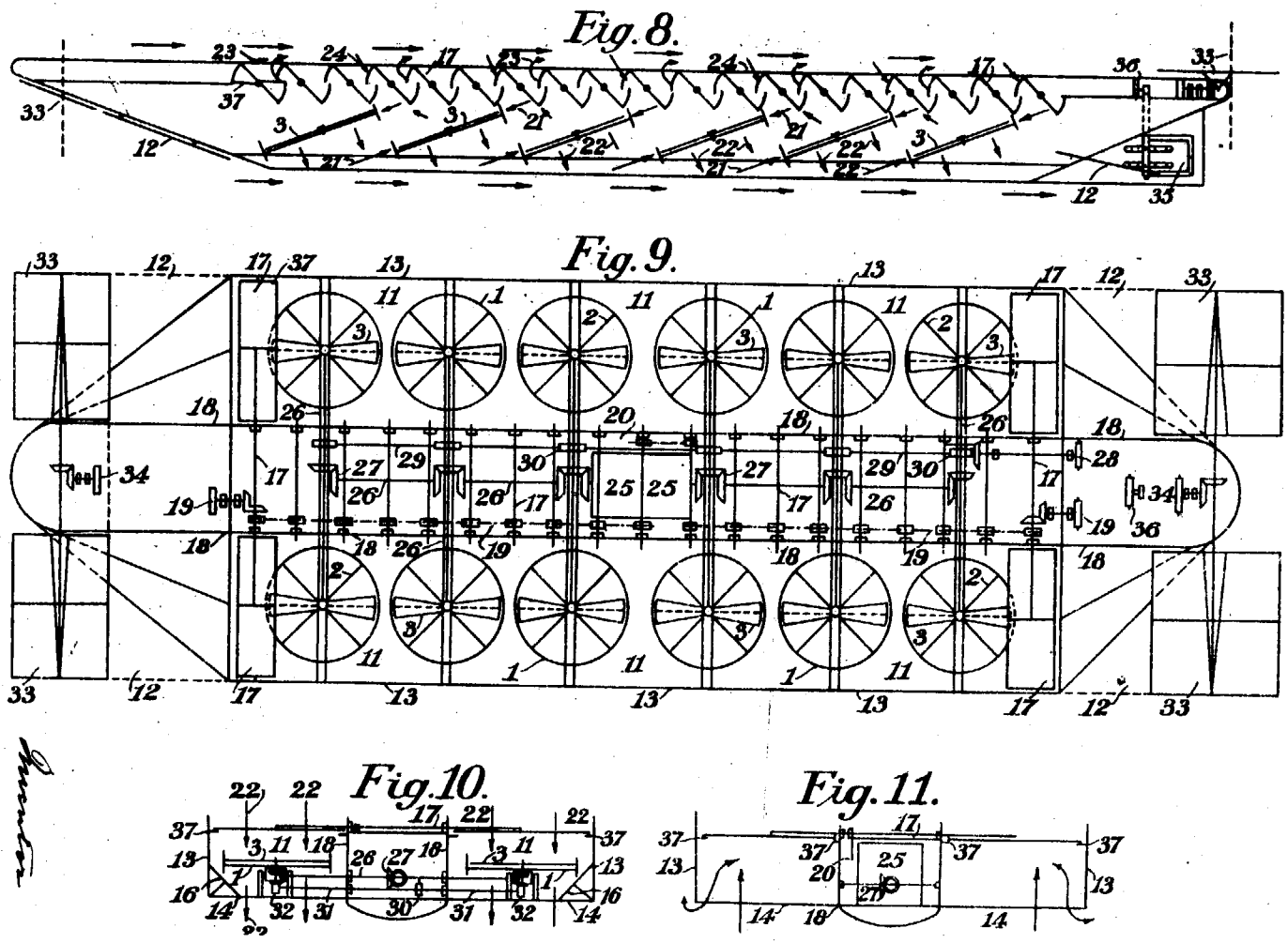
Inventor
George Albert Chaddock Reissued Sept. 30, 1924. Re. 15,922

UNITED STATES PATENT OFFICE.

GEORGE ALBERT CHADDOCK, OF LIVERPOOL, ENGLAND.

DEVICE FOR UTILIZING THE REACTIVE FORCE SET UP BY ROTATING A SCREW PROPELLER OR SCREW FAN OR THE LIKE IN A FLUID.

Original No. 1,491,982, dated April 29, 1924, Serial No. 572,753, filed July 3, 1922. Application for reissue filed August 14, 1924. Serial No. 732,349.

*To all whom it may concern:*

Be it known that I, GEORGE ALBERT CHADDOCK, a subject of the King of Great Britain, and a resident of Liverpool, England, have invented certain new and useful Improvements in a Device for Utilizing the Reactive Force Set Up by Rotating a Screw Propeller or Screw Fan or the like in a Fluid, of which the following is a specification.

The invention has for its object the utilization of reactive forces set up by the rotational action of displacing instruments such as power driven propellers, fans, and the like giving rise to a radial inflow into the disc area of the displacing instrument in the course of its rotation, constituting a force hitherto running waste which will be utilized under this invention by fitting a series of deflector rings around the periphery of the displacing instrument for deflecting the radial inflow rearwardly and thus freeing the displacing instrument from the incubus of an overload of fluid which tends to congestion and increased swirl effect. The deflector rings are sustained rigidly in position by carrier deflector supports adapted to receive the rings and maintain them in their angular position as suitably shaped and spaced apart from each other to avoid congestion of the fluid in course of deflection. These carrier deflectors are attached to and supported by radial arms the number of which arms may be varied to suit any particular requirement but intermediate carrier deflectors without supporting radial arms may be fitted to act also as stringers or binders for the deflector rings for suitably staying and strengthening same as required. These carrier deflectors and binding deflectors may be adjusted to a suitable angle where required to cause a portion of the radial inflow to be deflected in a direction opposite to that in which the displacing instrument rotates to help counteract the rotational swirl or torque effect. As the radial inflow constitutes the bulk of the feed for the propeller, under headway speed in water, and as this feed will be drawn through the deflector rings faster than the ship progresses, particularly with a displacer of fine pitch angle, the deflectors therefore cannot offer resistance to ahead speed but should on the other hand exert a powerful brake action in arresting headway speed when the propeller is reversed. The propeller now commonly applied, in both air and water, was originally adopted as an emergency device to overcome the difficulty of ocean propulsion where the application of side paddles became and still remains, from an efficiency standpoint, a sheer impossibility. Its operation should be considered as equivalent to that of an unenclosed pump with a triple feed comprised in a radial inflow, a frontal feed and rearward reaction flow all varying in proportion to the pump's rotational velocity, moreover as it is an unenclosed proposition it is consequently also subjected to severe reactive and varying pressures affecting its discharge, it follows nothing but the state of chaos and loss now ruling can be expected under such adverse conditions.

As the question of efficient propulsion really narrows itself down to that of obtaining headway speed by pumping the fluid rearwards it follows as a natural sequence that the feed should be derived as much as possible from the radial inflow in order to give the pump blades a grip of the fluid as any acceleration in advance of the instrument must necessarily reduce the value of the thrust reaction and as this thrust reaction will be exactly proportionate to the volume that can be forced rearwards, under direct pressure, it should be delivered as nearly as possible in a straight line and under a maximum of pressure such as can only be completely effected by controlling the frontal inflow. These are cardinal conditions necessary to efficiency. In the strongest possible contrast the under water rotational displacer is very severely handicapped by compound acceleration of the water which follows the rotational action of the displacer as well as that of its angular action in projecting water partly sideways and partly rearwards and in this connection the following wake in marine practice, set up by the skin friction and closing in of the water at the stern, under headway speed, causes increased resistance to the projection of water rearwards thereby causing the fluid which is driven at an angle against this resistance to cushion off it at a still more acute angle thus tending to bring about an increase in swirl effect and corresponding decrease in thrust reaction proportionate to rotational velocity. It follows the following wake resistance and reaction to the rearward drive forms at present a severe handicap to an under water angular displacer by causing an increase in swirl effect and considering that approximately 50% of the power now transmitted to the propeller is lost in rotational suction this loss is further seriously increased in the effort to deflect rearwards, at an angle, fluid to which circular acceleration has been imparted by the blade in advance which further causes induction of the frontal inflow at an acute angle under which the following blade operates at the greatest disadvantage by rotating in a fluid that has already been accelerated by the blade in advance, in either water or air, whereas by utilizing the radial inflow the feed is stabilized and a counter check over the rotary motion may also be effected by the radial inflow. As a fluid will always move on the line of least resistance and as the "law of gyration" or rotation of a fluid provides that a maximum volume can be moved at a minimum of expenditure of power rotationally, on the line of least resistance, it is therefore impossible to attain efficient thrust reaction as long as this detrimental action is facilitated as now under present conditions of rotational swirl as evidenced in the rotary wake stream. Another material point of importance is the fact that hitherto no attempt has been made to harness up the reactionary force arising from displacement pressure. As the pressure in water increases approximately 3/8ths of a pound per square inch of surface for every foot of immersion we thus have a very powerful auxiliary aid to thrust value that can be harnessed up by these deflector rings, the value of which will be proportionate to the depth at which the propeller operates in deep water ships and in submarine craft, when submerged. The deflectors will not only utilize the inrush of fluid behind the blade but they will also, by so doing, materially assist in stabilizing the pressure in the disc area and thus minimize vibration and ease the severe strains now borne by the propeller under present wide inequalities of radial pressure flow in the disc area as between the pressure at or near the surface and that at the keel which tends to propeller and shaft breakages. As the following wake exercises a powerful retardation action over the frontal inflow into a disc area it will thereby materially increase the radial inflow and add to the auxiliary thrust derived from the deflectors therefore the following wake or part of the energy absorbed thereby is also available to be utilized by this invention which should cause the rearwardly driven stream to be materially increased in volume and force of delivery by these deflectors which should result in a much higher rotational velocity being obtained than is at all possible under present conditions in which the instrument merely acts as a rotational angular displacer in the course of which the bulk of the power is now absorbed in setting up a rotational swirl or churning action whereas by these improvements the deflectors act as an auxiliary aid in such manner as to help the propeller to set up the equivalent of a really efficient screw action in a fluid by which a very much greater volume can be projected more directly rearwards and at a greater pressure, with its consequent reactive auxiliary thrust, than is otherwise possible. The equivalent gains arising from pressure displacement and following wake stream control over frontal inflow in water may be obtained in a proportionate degree in air under these improvements by providing means, in construction, to enable the reactive forces to be utilized to advantage in air. To enable the reactive forces to be efficiently harnessed up the propeller should be so shielded as to prevent any frontal inflow, on the line of axial advance, when in horizontal flight. To effect this a series of propellers may be fitted one behind the other in any form of hull that may be designed to be open to the passage of air from above or below and in which the propellers are protected from the effect of passing air, particularly from the front or bow on the line of axial advance, but in order to prevent crashing it is necessary also to utilize the reactive forces set up in forced descent, therefore for the effective utilization of these reactive forces a suitable design is set out which, while facilitating the full benefits of the radial inflow in horizontal flight, will also provide against crashing in forced descent which is an important feature under this design and to enable this to be carried out, the design described herein provides for the maximum lift by a series of propellers and planes under a relative minimum constructive weight proportionate to gross lift, with a wide expanse of air control resistance surface for offering resistance to forced descent under engine failure in a large craft. To enable this to be effected the central hull may, for marine purposes, be made watertight and adapted to carry the engine and all accessories also to accommodate passengers and crew. The propellers are mounted on suitable supports extending across the vessels and in such form as to enable a series of propellers to be rotated on each side of a craft and so shielded from frontal and passing air by suitable bow and side extensions as to enable the air flowing down through the controlled partition spaces to be so regulated and controlled as to restrict as much as possible the inflow on the shaft line in order to further enhance the radial inflow. For this purpose the partitioned spaces above the propellers will be so adjusted as to automatically regulate the air supply at the same time being subjected to such mechanical control as to further regulate and control the air feed by suitable hand controls fitted at both ends of the vessel and centrally in the engine room in such manner that all the controls may be operated simultaneously or in groups from either end or from the engine room to ensure instant closure of all air passages in case of forced descent, or for trimming purposes the air control partitions being also adjusted to close automatically directly the propellers stop when the partitions will form a pressure resisting deck to prevent crashing.

This method of air control will provide means for ensuring even a greater degree of control over frontal inflow than is obtained by the effect of the wake stream in water and thus enable the reactive forces derived from the radial inflow to be utilized to best advantage in horizontal flight. Tests of the effect of this control indicate that a retardation effect exercised over the inflow on the shaft line, at a suitable distance from the displacer, will increase the thrust effect of deflector rings by approximately 50% making a gross increase of 100% over and above that of propeller thrust. It is computed there will never be less than 10% retardation in marine practice which should increase the radial auxiliary thrust by more than the increase recorded by air tests. The controls for air will enable the retardation of frontal inflow to be regulated to the best advantage and to further enable efficient control to be exercised over the reactive forces the propellers being fitted one behind the other will exert a further controlling effect over the frontal inflow and assist in easing congestion of rearwardly driven column. The deflectors are therefore designed to provide for the utilization of reactive forces from two material standpoints. First—volumetric efficiency where such is the prime consideration and second—from the thrust standpoint where the actual thrust value is of main importance. By the means described the great bulk of the losses arising from the power now expended in rotational drag suction at the back of the blade are prevented and the efficiency of the instrument materially increased.

The invention is illustrated in the accompanying drawings in which Fig. 1 is a section in elevation showing rim deflectors and displacer to operate on stationary or push principles.

Fig. 8 is a side elevation of an airship broken away centrally to demonstrate how a greater or lesser number of propellers may be fitted in a form to ensure the efficient application of the invention for purposes of aerial navigation.

Fig. 9 is a plan showing the air controls and protected air reservoirs in which propellers operate and the control gear for regulating descent also the engine and connections therefrom to the various propeller shafts and means of controlling the angular movement of propellers as well as vertical and horizontal steering apparatus and their control.

Fig. 10 is a detail view of side screens for the propellers also upper air controls and means for their regulation as well as means for adjusting the angular movement of propellers and their deflecting device.

Fig. 11 is a detail showing engine with gear-wheel on driving shaft and cross section shafting with gear-wheel for transmission of power uniformly to the various propellers, the arrows indicating air compression and reaction in forced descent.

Figure 1:
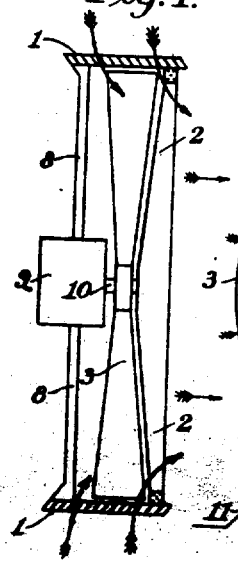
Figure 6:
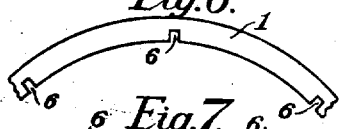
Figs. 6 and 7 are fragmentary detail views of a section of rim deflectors and their supports acting as rear deflectors.
Figure 7:
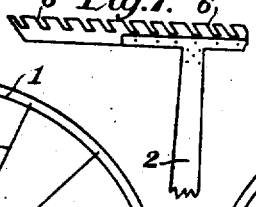

In carrying out the invention Fig. 1 shows the displacing instrument adapted to work on stationary principles for ventilation purposes or propulsion principles, the instrument being surrounded at its periphery by rings of deflectors (1) shown slotted in Fig. 6 and secured in corresponding grooves (6) in carrying deflector supports Fig. 7 supported by rear deflectors (2) and in some cases further stayed to auxiliary supports (8) such as a stern frame or other support, they may be further suitably stayed in ships or otherwise where deflectors may be subject to severe strains. The rear deflectors (2) while adapted to receive and sustain the cross section carrier deflector 6, as shewn in Fig. 7, also serve to materially control the rotary motion of the rearwardly driven column of fluid and thereby add to efficiency. Cross section 6 may be fitted at an angle suitable for deflecting a portion of radial inflow across the propellers in a direction opposite to its rotation where desirable.

Figure 2:
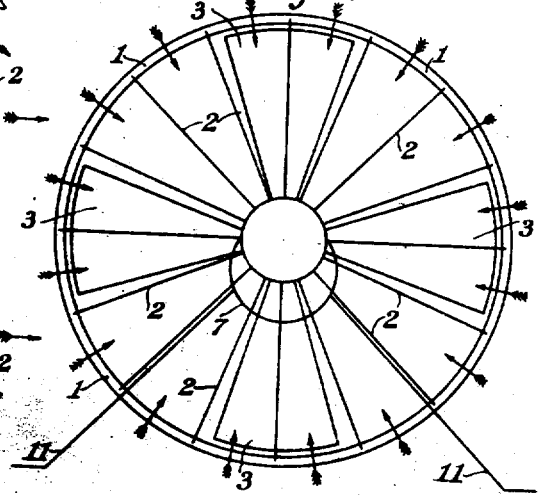
Fig. 2 is an end view of a fluid displacer propeller or fan operated on either push or stationary principles.
Figure 3:
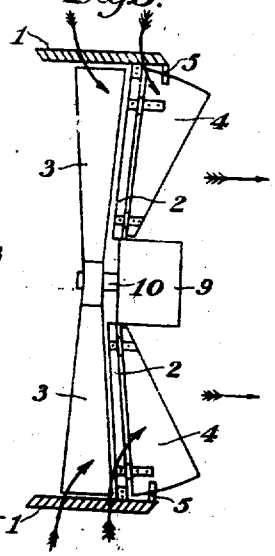
Fig. 3 is a view analogous to Fig. 1 to operate on a pull or stationary basis, setting out hinged extensions of rear deflectors.

Fig. 3 illustrates the power driven displacer (3) also peripheral deflector (1) and rear deflectors (2) adjusted to operate on stationary principles as applying to ventilation or forced draught with extended rear deflectors, where required, a portion of which may be hinged when in case of engine failure in aerial navigation the outer portion of rear deflector would automatically close when the machine commenced to descend the disc area thereby forming a large parachute. For this purpose the stops or projections (5) attached to the rim deflectors supports (6) regulate the degree of opening, the stops (5) also having flexible adjustments to cause re-action directly the pressure from rearward driven column of air ceases causing the deflectors to automatically close directly descent commences and thus prevent crashing. Closure controls may be fitted where required. Fig. 2 is an end view indicating by arrows, the inflow of air all around the periphery which is deflected rearwardly, by the deflector rings (1) thereby freeing the displacement instrument from the effect of an overload and thus enabling it to give increased impetus to the fluid sucked into the disc area from the front. The supports (11) attached to the support (7) are designed to offer the minimum resistance to air passage. The lines (2) indicate rear deflectors or radial arms as shewn in Figs. 1 and 3, which consist of radial arms serving to support and stay the carrier deflectors (6) which carrier deflectors sustain and hold rigidly in position the deflector rings (1).

Figure 4:
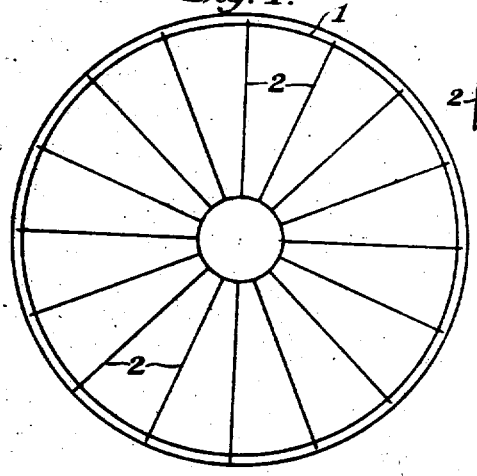
Fig. 4 is a rear end view of Fig. 1.
Figure 5:
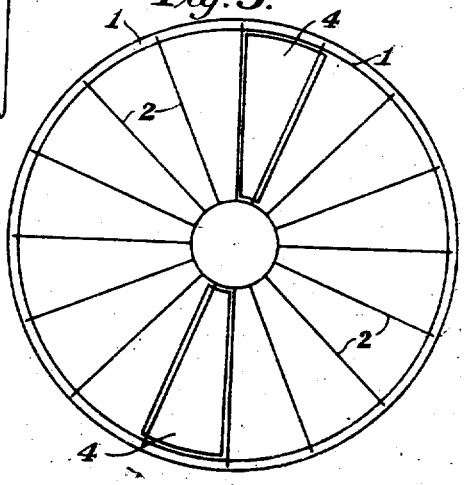
Fig. 5 is an end view of Fig. 3.

Fig. 4 is an end view of Fig. 1 showing approximate spacing of rear deflectors (2) acting as supports to rim deflectors (1). Fig. 5 is a rear end view of Fig. 3 showing the hinged portions in the closed position, to prevent crashing, and indicates the form of overlap by which each rear deflector, comprising sixteen in this plan, would automatically close thereby sealing up the disc area by preventing air passing through in descent under engine failure or to effect a closure when required in buildings or otherwise.

The number of rim deflectors and length of carriers or supports therefor will be governed by the diameter of the displacer. The arrows over the deflectors in Figs. 1 and 2 are indicative of the trend of the fluid towards the centre of the area of depression and indicate that the number of deflecting rings that can be usefully fitted will be in proportion to the increase in radius their angular adjustment conforming to requirements of each case also the greater the velocity that can be usefully attained the greater will be the proportionate pressure taken up by these deflectors and the consequent reactionary force exerted as an auxiliary aid to volumetric efficiency for ventilation or forced draught or to thrust value. In this respect under present procedure power is unnecessarily wasted in the translational process of attaining velocity in air at the expense of thrust value. In this translational process a thrust value of 375 lbs. per horse power at a velocity of 1 mile per hour is reduced approximately to 3¾ lbs. per horse power at 100 miles per hour it follows the weight borne is only sustained by attaining velocity at the expense of thrust value. the procedure itself forms a severe handicap upon the speed that should be obtained in air as a fluid 832 times less dense than water which alone demonstrates that propulsion methods applicable to water are not conducive to efficiency in air.

In strong contrast to present procedure the peripheral inflow can be utilized to advantage for sustentation purposes at the same time materially conserving the thrust value which thrust can also be applied as an additional aid to sustentation, the air craft itself as well as its re-active force in horizontal flight affording further additional means for the more efficient utilization of the re-active forces to be harnessed up arising as a sequence to forced displacement.

Fig. 8 is a side elevation of an air ship with the side screen removed to show propellers and air controls designed to facilitate as well as aid the utilization of the re-active force set up by the power driven displacing instrument when driving the vessel carrying it through the fluid. The displacers or propellers (3) encircled by their rim deflectors (1) are shown fitted along the length of the hull and operated in a protected space or air reservoir (11) formed by end planes (12) and side screens (13) stayed by outrigger platforms (14) carrying propeller shafting bearings and upright supports for screens and their stays (16). The air controls (17) fitted between the screen (13) and the side of hull (18) are fitted along the hull and between the hull and the screen on each side of the craft to enable the reactive force arising from displacement to be utilized to advantage in aerial navigation by creating the equivalent of subdivided spaces in so far as air control from above or below is affected these outrigger controls being shaped and fitted to act as an air cut off in each section and to otherwise assist in setting up approximately the equivalent of an atmospheric depression in the well or spaces of wells or air reservoirs. The controls (17) are pivoted at a point in which the under surface will present a larger air resisting surface than the upper section so that in event of engine failure they will close automatically directly descent commences. They would likewise open automatically on starting the engine the upper surface of these controls being shaped to facilitate the passage of air when in horizontal flight will consequently be heavier than the lower section and therefore over-balance the larger area of the lower section thus aiding in effecting automatic control but for purposes of effecting a safe landing and trimming in descent controls (19) Fig. 9 are fitted to enable a closure or partial closure to be effected at one end only or both ends if or when desired. Two controls with air cut offs are shown, one at each end and on each side the space for remaining cut off controls (17) being left open to indicate the propellers and their supports also skeleton lines of rim deflectors in position of direct lift and approximate lines of rear deflectors. The shafts of all controls are set out to indicate the method and details of control. For emergency purposes a separate control (20) is fitted adjacent to the engine by which the engineer can instantly connect the controls at each end and close them all before descent commences in event of engine failure. The controls consist of sprocket wheels fitted on each shaft with chain connections in a form to admit of each end being controlled separately, so that any tendency to end tipping, in descent may be regulated. A separate connection between the two end controls is fitted on the opposite side to enable the engineer to engage and couple up both end controls by his connection, of a clutch device, linking up the controls at both ends and effecting immediate closure of all the divided spaces in event of engine failure when, failing his prompt action, they would all close automatically under air pressure from below. The arrows shown in Fig. 8 are indicative of air movement on the outside and inside of air reservoirs the larger arrows on the outside are indicative of the air current through which the vessel is passing which is the equivalent of wind pressure exerted on a stationary building when with an open door a somewhat internal exhaust action is set up causing doors to slam to. In this case the outer arrows are indicative of outer air above and below a reservoir filled with air in direct contact with the air through which it is being carried through and with which it is in frictional and suctional unison this being so the effect of this suctional and frictional contact also the inherent tendency of air to flow on the line of least resistance is utilized in this process of dissociation to advantage, the suctional or pull out effect above helping to aid thrust value and the suctional frictional effect below helping to relieve congestion of rearward driven column. The arrows (21) represent the air sucked in through the deflectors at the sides of the propellers which forms a material cut off or check on the inflow over the propellers immediately behind while the underside of that propeller draws largely from the air forced rearwards by the propeller in advance thus minimizing rearward congestion as with each propeller the suction effect is made use of both to retard the inflow above and to ease the congestion of rearward driven column beneath the adjacent blade section. Experiments carried out to determine the effect of this control demonstrated greatly increased thrust values were obtained thereby. Arrows (22) are indicative of rearward driven column being forced into passing air stream subject however, to recurvature in centre, proportionate to control of inflow from above. Arrows (23) are indicative of the area of least resistance immediately over the centre of propeller. The pull of the outer air in this division will tend to materially enhance the thrust value of the propeller itself as well as to increase the side inflow of air through deflectors and thereby add to their efficiency. The arrows (23) are intended to indicate the upcast pull effect rather than output but if the passing current is strong enough to effect an upcast in the form of an output it will still further improve the thrust value of the propeller as experiments thereon demonstrate the greater the retardation of inflow and control thereof the greater the resultant thrust therefrom, the volume of air sent rearwards decreasing in proportion to increased thrust, it follows with a powerful upcast at (23) the cycle would be completed approximately at (24) with a somewhat variable zone space between. Under these plans when the anemometer records recurvature in the centre of disc area the thrust is improved by the rotary movement in the area of each blade section which conforms somewhat to the equivalent of nature's phenomena. Displacers fitted to operate in a closed in space are shown in Fig. 8 spaced and set at an angle for lift drive control. As the lift will be proportionate to the efficient utilization of the reactive forces the angle of lift or lift drive should conform thereto. Controls (28) are fitted to connect with shafts (29) which connect with levers (30) connecting cross shafting (31) and its gear wheel with gear-box attachment (32) for varying the angular movement of propellers and their deflectors in order that the angle of propellers may be varied to suit changing conditions in navigation and to meet general requirement. The gear connections between the engine and various propellers are adjusted to cause the propellers one behind the other to revolve in opposite directions and thus neutralize shaft torque effect so as to ensure easy angular adjustments. The engine or engines (25) may be connected with the various propellers by suitable shafting (26) and gearing (27) to ensure uniform power distribution and uniform reaction effect by the displacing instruments and otherwise thus maintaining stability aided by stabilizing planes (33) adjusted to be moved to any desired angle for lifting or depressing the bow or stern by controls (34) also acting as an aid in forced descent by keeping the vessel on an even keel. Horizontal steering in air or water is by the rudder (35) and steering controls (36). Side chocks (37) on Fig. 8 are to fill up clearance space between the cut off and the screen, also at the vessel's sides, to allow freedom of angular movement of air controls and to block the passage at inner and outer ends when closed the blocks being shaped to bind the screen and air controls together also to the sides of the craft when subject to air pressure from below.

The velocity of air and its pressure flowing in at the periphery should prove to be greater for lift purposes under the plans detailed than the equivalent results from the same propeller with a plane in horizontal flight. As each deflector ring will be relatively narrow and as a large number of these rings will be fitted it follows that, theoretically, greater efficiency should result than can be obtained by the same surface area of a plane considering also the additional lift thrust of the displacing instrument as well as the increased gain proportionate to the degree of control that may be exercised over the inflow into the disc area when in horizontal flight. As an indication of the outcome of conforming to nature's conditions it has been ascertained by laboratory experiments solely with air and with model displacers of 2 ft. 3 ins. diameter that with the testing machine fixed at the scale limit of the maximum pull of the propeller alone, under normal conditions, and by thereafter exercising control over the inflow in a manner to conform approximately to nature's conditions enabling reactive forces to be utilized a scale pull thrust was registered four times greater than under normal conditions without in any way interfering with the displacer or the machine carrying it. The same degree of power was employed in each comparative test thus demonstrating the utility of conforming to nature's procedure rather than swirling a propeller round in thin air. Records of the volume of air driven rearwards demonstrate that with model displacers of approximately 2 ft. 3 inch. diameter the rearward flow of air at the tips, with the anemometer just inside the outer edge of tip, was approximately one-third of the volume registered in comparison to what the same anemometer registered in the same position with the addition of ring deflectors, the same degree of power and number of revolutions being applied in each test thus demonstrating the extent of inrush towards the centre also the overload and its consequences in setting up congestion of rearward driven column whereas, by the aid of rim deflectors, the bulk of the inrush at tips is forced rearwards by the deflectors thereby giving increased impetus thereto and freeing the displacer from this over-load and its congestive effect. The increased thrust from the auxiliary aids, which is very material, has been found to be proportionate to the effective area of rim deflectors, as proportionate to diameter, and the peripheral velocity of the power driven displacer. Beyond this the degree of control to be exercised over the frontal inflow in horizontal flight will further increase the efficiency of the auxiliary aids for thrust purposes but decreases volumetric efficiency.

Anemometer readings of the inflow at tips and also the volume of rearward driven column, at its maximum pressure in centre of blade, indicate the relative proportions vary according to diameter of the instrument of displacement also the shape of blade section and peripheral velocity but with any kind of propeller it is found the degree of inflow at tips is a very material facter in the general inflow, displacers of only 2 ft. 6 ins. in diameter registering 87% inflow at tips compared to similar test of rearward driven column at maximum pressure in centre of blade under the same power conditions applying to other experiments, it follows that the reactive effect of the fluid set up by the power driven displacer is a very valuable adjunct to thrust value if utilized inasmuch as the effect created is the equivalent of a depression area with its counter controlling forces unimpaired thereby that is a depression area with its magnetic or other forces of attraction remaining approximately constant notwithstanding the effect of the depression it follows that if, in addition to the rim deflectors, the frontal inflow is further controlled the increased counter suction of the propeller will be materially augmented by the opposing forces magnetic or otherwise which remain a constant factor in the depression area as practically unaffected thereby it being impossible for the displacing instrument to dislodge or reduce nature's controlling force regulating air movements hence the value of obtaining all possible control over the frontal inflow as an aid to auxiliary lift and thrust value whereas instead of aiding the propeller, under existing aeroplane procedure the weight is sustained by a lifting force derived from and at the expense of resistance to progress it follows the system itself in scientifically wrong operating prejudicially as it does to the speed that should be obtained without such a severe and unnecessary handicap. If a marine ship were similarly handicapped it would mean driving the vessel broadside on where she is now driven endways thus enabling the load to be apportioned over a length of hull very much greater than her breadth whereas the reverse conditions are applied to aeroplanes thereby demonstrating the present procedure involves the severest possible handicap upon speed as well as unnecessary limitations to load and dangers from accidents.

In strong contrast to existing procedure

Figs. 8 and 9 will indicate that by utilizing the re-active forces set up by a power driven displacer or propeller it becomes possible to obtain an enormous lifting force proportionate to the horse power and number of propellers employed without increasing the area of resisting surface as is at present the case with planes fitted one above another or with an increase of span which in each case render the craft proportionately unwieldy and dangerous, whereas under this invention while the plane resisting surface at the bow—as shown in Figs. 8 and 9—may be even less in breadth than that of an existing machine any reasonable number of propellers may be fitted along the length of the vessel to effect a lift and lift drive on lines akin to nature's system of control without the disabilities now ruling in aeroplanes of increased surface areas exposed to wind pressure with its retarding effect. We thus obtain the equivalent advantages ruling in marine practice of weight distributed over the length of craft rather than her breadth and consequent equivalent increase in speed arising therefrom. Furthermore, the plan provides that the gross weight lifted shall form the driving force at the most efficient angle of lift drive, a force therefore that will prove very much more effective and economical than present procedure. The ground is thus opened up, by this invention, for lifting heavy loads and at the same time obtaining increased speed and a greater degree of safety than is otherwise possible.

I claim:

1. A series of fixed ring deflectors peripherally surrounding a power driven propeller or fan said deflectors inclined at an angle to deflect rearwardly the fluid entering from the outer cercumference of the rings.

2. In an aircraft protected air spaces for shielding the power driven propellers or fans from frontal or side inflow said spaces being subdivided above the displacing instruments by adjustable air controlled partitions suitably spaced and arranged to open automatically when starting the engine actuating the propellers and to close automatically when the engine stops to control the air movements and thus form an air or partial air reservoir for controlling and utilizing reactive forces as an aid to thrust in flight and to prevent crashing by retarding descent under engine failure.

3. A series of fixed ring deflectors peripherally surrounding a power driven propeller or fan said deflectors inclined at an angle to deflect rearwardly, the fluid entering from the outer circumference of the rings, radial arms forming supports for sustaining and staying carrier deflectors with their attached ring deflectors.

4. A series of fixed ring deflectors peripherally surrounding a power driven propeller or fan said deflectors inclined at an angle to deflect rearwardly the fluid entering from the outer circumference of the rings, radial arms forming supports for sustaining and staying carrier deflectors with their attached ring deflectors, said carrier deflector supports being adapted to receive and stay the ring deflectors and to help counteract rotary motion of the fluid.

5. A series of fixed ring deflectors peripherally surrounding a power driven propeller or fan said deflectors inclined at an angle to deflect rearwardly the fluid entering from the outer circumference of the rings, radial arms forming supports for sustaining and staying carrier deflectors with their attached ring deflectors, said carrier deflector supports being adapted to receive and stay the ring deflectors and to help counteract rotary motion of the fluid, hinged extensions adapted for closure of the air spaces in the rear of the disc area.

6. In an aircraft protected air spaces for shielding the power driven propellers or fans from frontal or side inflow said spaces being subdivided above the displacing instruments by adjustable air controlled partitions suitably spaced and arranged to open automatically when starting the engine actuating the propellers and to close automatically when the engine stops to control the air movements and thus form an air or partial air reservoir for controlling and utilizing reactive forces as an aid to thrust in flight and to prevent crashing by retarding descent under engine failure, means for so adjusting said partitions as to further aid in regulating the air supply to any required degree or to effect a closure collectively or in groups from the engine room or from either or both ends of the craft for trimming purposes to effect a safe landing on an even keel.

7. In an aircraft protected air spaces for shielding the power driven propellers or fans from frontal or side inflow said spaces being subdivided above the displacing instruments by adjustable air controlled partitions suitably spaced and arranged to open automatically when starting the engine actuating the propellers and to close automatically when the engine stops to control the air movements and thus form an air or partial air reservoir for controlling and utilizing reactive forces as an aid to thrust in flight and to prevent crashing by retarding descent under engine failure, means for so adjusting said partitions as to further aid in regulating the air supply to any required degree or to effect a closure collectively or in groups from the engine room or from either or both ends of the craft for trimming purposes to effect a safe landing on an even keel, shafting and gearing for ensuring uniform power and velocity of all displacing instruments.

8. In an aircraft protected air spaces for shielding the power driven propellers or fans from frontal or side inflow said spaces being subdivided above the displacing instruments by adjustable air controlled partitions suitably spaced and arranged to open automatically when starting the engine actuating the propellers and to close automatically when the engine stops to control the air movements and thus form an air or partial air reservoir for controlling and utilizing reactive forces as an aid to thrust in flight and to prevent crashing by retarding descent under engine failure, means for so adjusting said partitions as to further aid in regulating the air supply to any required degree or to effect a closure collectively or in groups from the engine room or from either or both ends of the craft for trimming purposes to effect a safe landing on an even keel, shafting and gearing for ensuring uniform power and velocity of all displacing instruments, shafting and gearing for ensuring uniform simultaneous angular adjustment of all displacing instruments.

9. In an aircraft protected air spaces for shielding the power driven propellers or fans from frontal or side inflow said spaces being subdivided above the displacing instruments by adjustable air controlled partitions suitably spaced and arranged to open automatically when starting the engine actuating the propellers and to close automatically when the engine stops to control the air movements and thus form an air or partial air reservoir for controlling and utilizing reactive forces as an aid to thrust in flight and to prevent crashing by retarding descent under engine failure, means for so adjusting said partitions as to further aid in regulating the air supply to any required degree or to effect a closure collectively or in groups from the engine room or from either or both ends of the craft for trimming purposes to effect a safe landing on an even keel, shafting and gearing for ensuring uniform power and velocity of all displacing instruments, shafting and gearing for ensuring uniform simultaneous angular adjustment of all displacing instruments, stabilizing end controls at each end with their operating control connections.

GEORGE ALBERT CHADDOCK.

Witnesses:
W. F. HOLLWAY,
J. COCKBURN.